US007701361B2

(12) United States Patent
Lee et al.

(10) Patent No.: US 7,701,361 B2
(45) Date of Patent: Apr. 20, 2010

(54) PARKING INFORMATION SENSING DEVICE AND PROVIDING METHOD THEREOF

(75) Inventors: Ming-Town Lee, Taipei County (TW); Tain-Wen Suen, Taoyuan County (TW); Tung-Jung Hsu, Taoyuan County (TW); Chuen-Lin Bau, Taoyuan County (TW)

(73) Assignee: Chun Shan Institute of Science and Technology, Araments Bureau, M.N.D., Taoyuan County (TW)

( * ) Notice: Subject to any disclaimer, the term of this patent is extended or adjusted under 35 U.S.C. 154(b) by 311 days.

(21) Appl. No.: 11/781,556

(22) Filed: Jul. 23, 2007

(65) Prior Publication Data

US 2009/0027231 A1 Jan. 29, 2009

(51) Int. Cl.
*B60Q 1/48* (2006.01)
*G08G 1/14* (2006.01)

(52) U.S. Cl. .................................... 340/932.2; 340/942

(58) Field of Classification Search ............. 340/932.2, 340/942; 705/13

See application file for complete search history.

(56) References Cited

U.S. PATENT DOCUMENTS

| | | | | |
|---|---|---|---|---|
| 5,432,508 A * | 7/1995 | Jackson | ................... | 340/932.2 |
| 6,229,455 B1 * | 5/2001 | Yost et al. | ................ | 340/932.2 |
| 6,885,312 B1 * | 4/2005 | Kirkpatrick | .............. | 340/932.2 |
| 6,946,973 B1 * | 9/2005 | Yanda | ...................... | 340/932.2 |
| 2005/0280555 A1 * | 12/2005 | Warner | .................... | 340/932.2 |

* cited by examiner

*Primary Examiner*—John A Tweel, Jr.
(74) *Attorney, Agent, or Firm*—Rosenberg, Klein & Lee

(57) ABSTRACT

A parking information sensing device is disclosed. Each parking space in a parking lot is disposed with a parking information sensing device, detecting whether a car on the parking space. By means of a driving control circuit, the sensing device drives a light emitting unit to emit a light and a reflecting element of the parking space is on a pathway of the light. Light is reflected by the reflecting element and then passes light sensing unit that detects the reflected light and generates a first sensing signal sent to the driving control circuit. Thus the driving control circuit judges if there is no vehicle on the parking space. On the other hand, it judges if there is a car on the parking space according to another sensing signal. The sensing device further includes a first transmitting/receiving unit that forms a wireless mesh network among parking information sensing devices.

18 Claims, 6 Drawing Sheets

PARKING INFORMATION SENSING DEVICE AND PROVIDING METHOD THEREOF

BACKGROUND OF THE INVENTION

The present invention relates to a sensing device, especially to a parking information sensing device and a providing method thereof.

Cars or motorbikes are the most common kinds of transportation. But it's getting difficult to find out a parking space in a parking lot, especially in a parking lot of shopping malls, department stores or other places. Most users of the parking lot now uses tickets to record status of the parking space. Users only know the number of available parking space through a display panel on an entry of the parking lot. However, they can't get precise location of the available parking space immediately and users can only find out the empty parking space in sight. Once there are only few cars in the parking lot, it's easy to get a parking space. If there is a lot of cars occupied the parking space, it's getting difficult to find out available space.

In order to solve above problems, a parking information system is disclosed. Referring to U.S. Pat. No. 6,147,624, Method and apparatus for parking management system for locating available parking space, a parking management system is provided so that users learn available parking space quickly and park their car easily. However, a sensing device being used is infrared sensor and the infrared sensor itself has low detection sensitivity. It can only detect there is a car on the parking space roughly.

Thus there is a need to develop a parking information sensing device and a providing method thereof that improves precision of checking of parking space status by more sensitive way with lower cost and maintenance fee. Thus people know available parking space easily and precisely.

SUMMARY OF THE INVENTION

Therefore it is a primary object of the present invention to provide a parking information sensing device and a providing method thereof that use a light-gathering member with a wire harness to receive the reflected light for checking whether there is a car on the parking space. Light emitted from a light emitting unit and reflected by a reflecting element within a circle area $\pi r^2$ whose radius is the wire harness length is all collected and is sent to a light sensing unit. The light-gathering member with wire harness is convenient for installment and adjustment.

It is another object of the present invention to provide a parking information sensing device and a providing method thereof that use a transmitting/receiving unit to send sensing results of parking space for showing users and managing personnel availability of the parking space. And a plurality of transmitting/receiving units forms a wireless mesh network that detects parking space in the parking lot.

In order to achieve above objects, a parking information sensing device and a providing method thereof according to the present invention are disclosed. The parking information sensing device includes a driving control circuit coupled to a light emitting unit as well as an light sensing unit. The driving control circuit drives the light emitting unit emitting a light to a parking space while a reflecting element such as a mirror is arranged on the parking space and is located on a path of the light emitted from the light emitting unit. The light sensing unit receives the light reflected by the reflecting element. After receiving the reflected light, the light sensing unit generates a sensing signal that is sent to the driving control circuit so that the driving control circuit judges whether there is a car on the parking space according to the sensing signal. Moreover, judging results of the driving control circuit can be displayed by indicating light units. A first transmitting/receiving unit of each parking information sensing device communicates with one another and forms a wireless mesh network.

This invention further includes a monitoring device disposed with a second transmitting/receiving unit corresponding to the first transmitting/receiving unit of the parking information sensing device. Through the wireless mesh network formed by a plurality of first transmitting/receiving units, the second transmitting/receiving unit receives judging results of the parking space for showing users the results. Furthermore, the monitoring device actively sends command signals so as to make the parking information sensing system report the status itself through the wireless mesh network to the monitoring device and the status is displayed. Therefore, managing personnel can easily do tasks of system fees calculation, management and quickly maintenance.

This invention further includes a parking information display panel disposed with a third transmitting/receiving unit corresponding to the first transmitting/receiving unit of the parking information sensing device. Through the wireless mesh network formed by a plurality of first transmitting/receiving units, the third transmitting/receiving unit receives judging results of the parking space. The parking information display panel not only shows amount of available parking space but also displays precisely parking spaces on each floor of the parking lot for users' convenience.

A method for providing parking information includes a plurality of steps. Emitting a light to a parking space, and then detecting the light being reflected from the parking space. Judging whether the parking space is occupied by a car in accordance with a sensing result. When the reflected light is reflected by the reflecting element, a first sensing signal is generated so as to judge that there is no car on the parking space. On the contrary, it is judged that there is a car on the parking space. In addition, the judging result of the parking space is transmitted to the monitoring device or the parking information display panel by wire or wireless for being displayed.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1A:
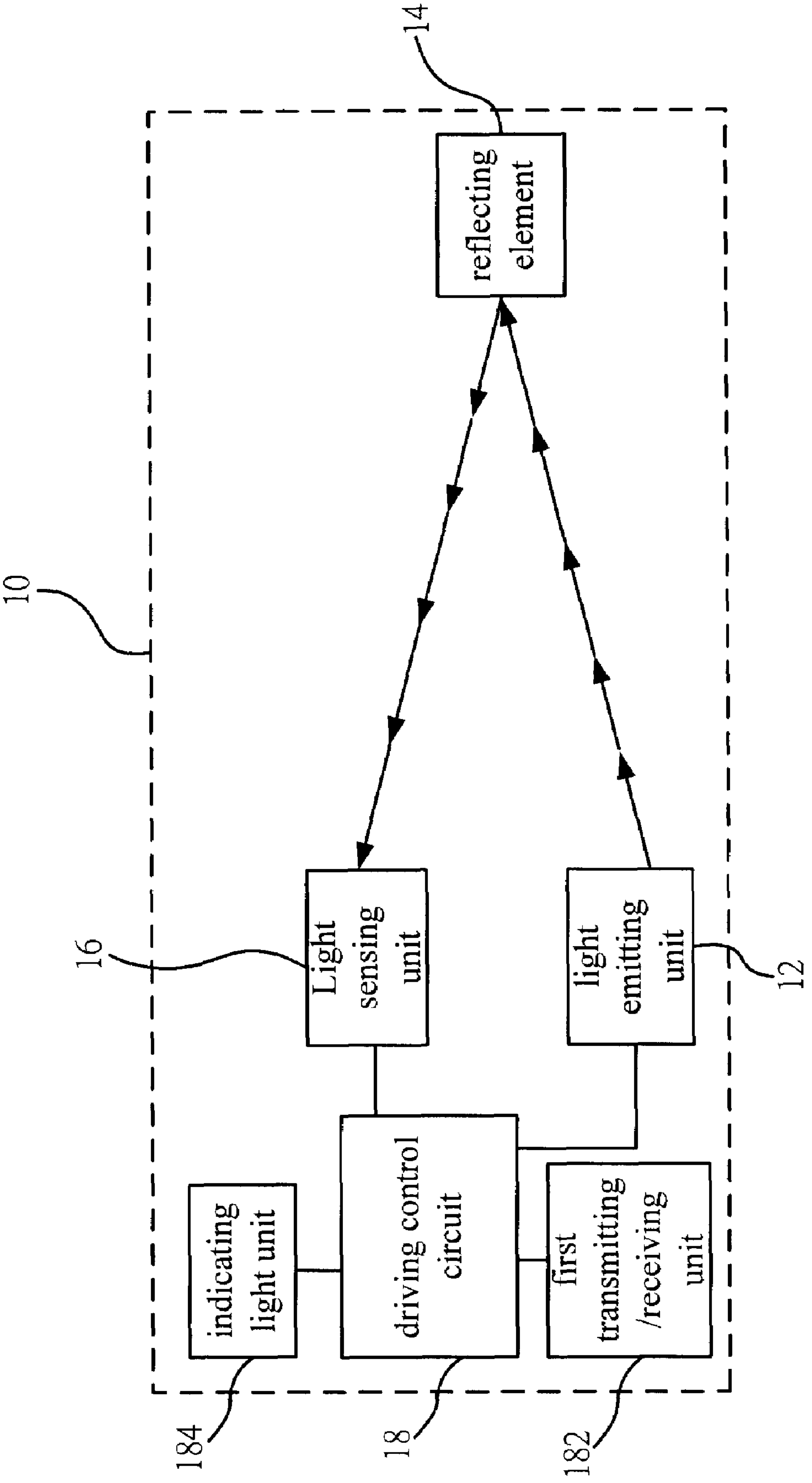
FIG. 1A is a schematic drawing of an embodiment according to the parking information sensing device of present invention.
Figure 1B:
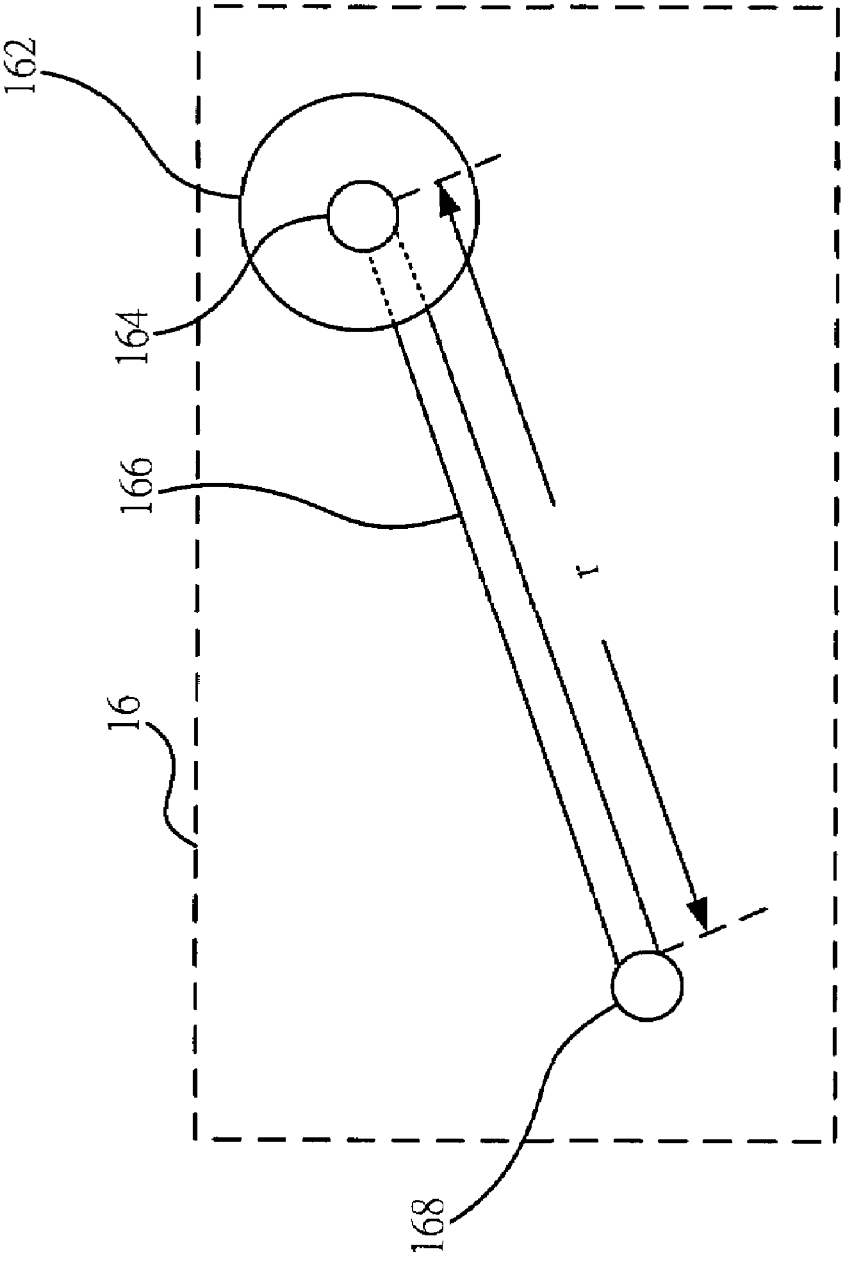
FIG. 1B is a schematic drawing of an embodiment according to the light sensing unit of the parking information sensing device of present invention.
Figure 2:
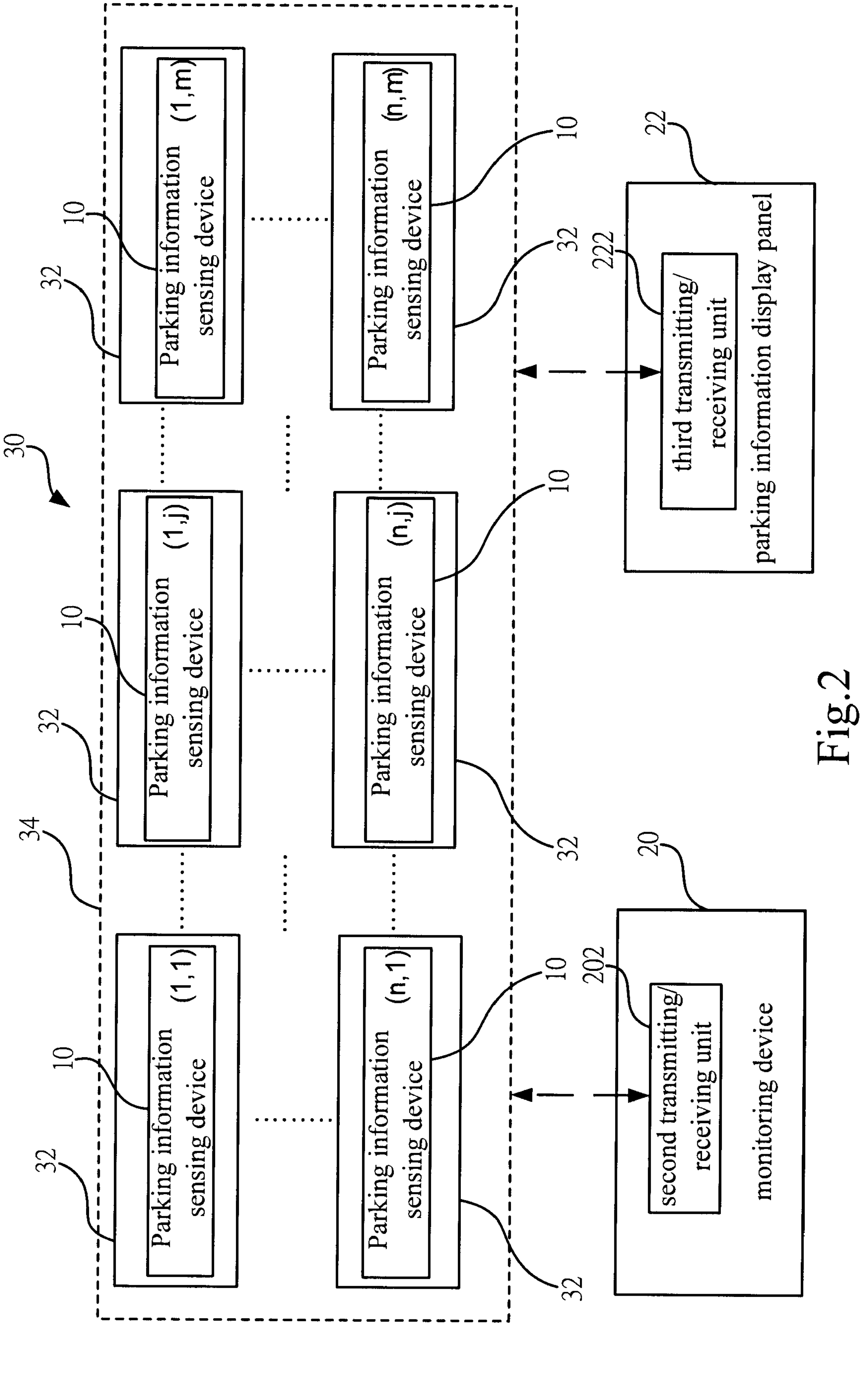
FIG. 2 is a schematic drawing showing numbers of parking information sensing devices forming a wireless parking information sensing network working with the parking information display panel and a monitoring device of an embodiment according to the present invention.

Referring to FIG. 1A, FIG. 1B, and FIG. 2, a parking information sensing device 10 detects whether a single parking space 32 within a parking lot 30 is occupied by a vehicle or not. The parking information sensing device 10 composed of a light emitting unit 12, a reflecting element 14, a light sensing unit 16 and a driving control circuit 18 is disposed on each of the parking space 32. The light emitting unit 12 corresponds to the parking space 32 while the reflecting element 14 is arranged on the parking space 32 and is located on a path of the light emitted from the light emitting unit 12. The light sensing unit 16 is located on a path of light reflected by the reflecting element 14. The driving control circuit 18 is coupled to the light emitting unit 12 as well as the light sensing unit 16 and is to drive the light emitting unit 12 emitting a light to the reflecting element 14 on the parking space 32. The reflecting element 14 reflects the light from the light emitting unit 12 to the light sensing unit 16 so as to detect status of the parking space 32.

As shown in FIG. 1B, the light sensing unit 16 is further disposed with a light-gathering member 162 having wire harness for receiving light and detecting the parking space 32. The light-gathering member 162 consists of a receiver 164 connected with a wire harness 166 and the wire harness 166 connected with a light receiving point 168. Wire harness length r is the distance from the receiver 164 to the light receiving point 168 and light from the light emitting unit 12, reflected by the reflecting element 14 and toward the light sensing unit 16, inside a circle whose radius is the wire harness length r is all collected. Thus the area receivable by the light sensing unit 16 is enlarged to $\pi r^2$ and this is convenient for installment and adjustment. The light-gathering member 162 is designed with a parabolic surface for concentrating reflected light and improving light-receiving accuracy.

When the parking space 32 is not occupied by any vehicle, the light sensing unit 16 receives light reflected by the reflecting element 14 through the light-gathering member 162 and generates correspondingly a first sensing signal that is sent to the driving control circuit 18. According to the first sensing signal, the driving control circuit 18 drives an indicating light unit 184 so as to show a signal of available space. Furthermore, the driving control circuit 18 further transmits this checking result by a first transmitting/receiving unit 182, received by the next first transmitting/receiving unit 182 of the Parking information sensing device 10 nearby in the parking lot 30 and being transmitted again, finally arriving at monitoring device 20 and a parking information display panel 22 for parking spaces. For example, when there is a car on the parking space 32, the car blocks (interrupts) light emitted from the light emitting unit 12 so that the reflecting element 14 reflects no light to the light sensing unit 16. Thus there is no first sensing signal generated by the light sensing unit 16. Then the driving control circuit 18 checks if there is a car on the parking space 32. Similarly, when there is no obstacle interrupts, light from the light emitting unit 12 is reflected by the reflecting element 14 and arrives the light sensing unit 16. Thus the light sensing unit 16 generates the first sensing signal that is sent to the driving control circuit 18 so as to judge that there is no vehicle on the parking space 32. Moreover, the light sensing unit 16 detects the received light according to a threshold value. When the light sensing unit 16 detects that the intensity of the received light no more less than the threshold value, it correspondingly generates the first sensing signal to make the driving control circuit 18 judge there is no vehicle on the parking space 32. When the light sensing unit 16 senses the intensity of the received light is less than the threshold value, it correspondingly generates a second sensing signal that enables the driving control circuit 18 to judge that there is a car occupied the parking space 32. The roof of the car reflects or scatters light emitted from the light emitting unit 12 so that the light sensing unit 16 detects no reflected light or just scattered light. Thus the light sensing unit 16 receives the light whose intensity is lower than a threshold value and then drives the driving control circuit 18 to recognize that there is a car on the parking space 32 according to sensing results thereof. At last, the first transmitting/receiving unit 182 transmits the checking result of the driving control circuit 18 so as to show status of the parking space 32.

The driving control circuit 18 is further coupled to the indicating light unit 184 that displays light signals corresponding to checking results of the driving control circuit 18. For example, when the driving control circuit 18 checks there is no car on the parking space 32, the indicating light unit 184 turns on a light for showing empty status. When the driving control circuit 18 checks there is a car occupied the parking space 32, the indicating light unit 184 lights a light showing occupied status.

Furthermore, the first transmitting/receiving unit 182 supports communication protocol of Zigbee or IEEE802.15.4 so that all of the parking information sensing devices 10 within a parking lot 30 form a wireless mesh network 34 through communications among the first transmitting/receiving units 182. Similarly, a second transmitting/receiving unit and a third transmitting/receiving unit can also support communication protocol of Zigbee or IEEE802.15.4.

Referring to FIG. 2, the present invention includes a monitoring device 20 disposed with a second transmitting/receiving unit 202 and a parking information display panel 22 with a third transmitting/receiving unit 222. The second transmitting/receiving unit 202 and the third transmitting/receiving unit 222 connect to the wireless mesh network 34. The first transmitting/receiving units 182 sends checking results of the driving control circuit 18 to the second transmitting/receiving unit 202 and the third transmitting/receiving unit 222 while the monitoring device 20 receives the checking results of the driving control circuit 18 through the second transmitting/receiving unit 202 for showing the results. In similar way, the parking information display panel 22 receives and displays the checking results of the driving control circuit 18 through the third transmitting/receiving unit 222. Furthermore, the monitoring device 20 sends command signals to each parking information sensing device 10 for sensing status thereof and then each parking information sensing device 10 reports the status itself through the wireless mesh network 34 to the monitoring device 20 and the status is displayed so as to achieve purposes of system fees calculation, management and quickly maintenance.

Figure 3:
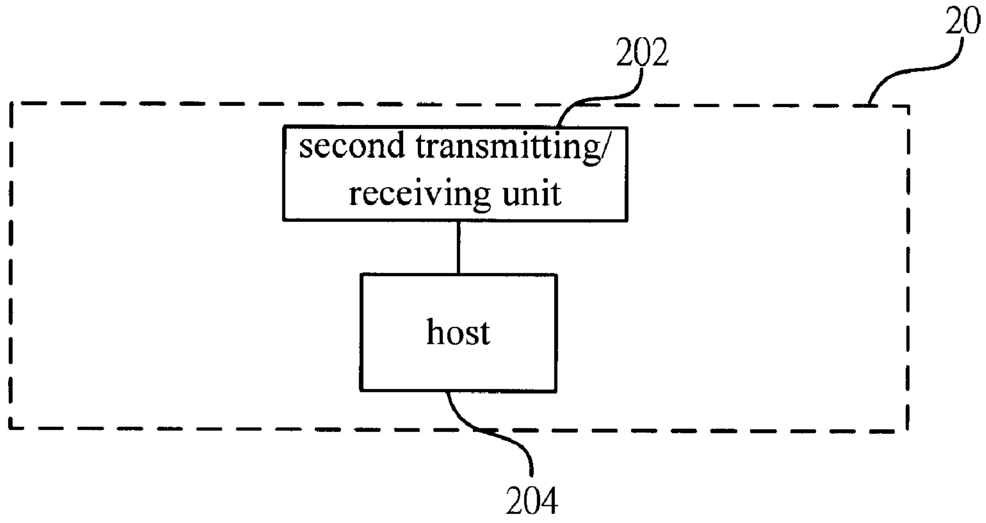
FIG. 3 is a schematic drawing showing a monitoring device of an embodiment according to the present invention.
Figure 4:
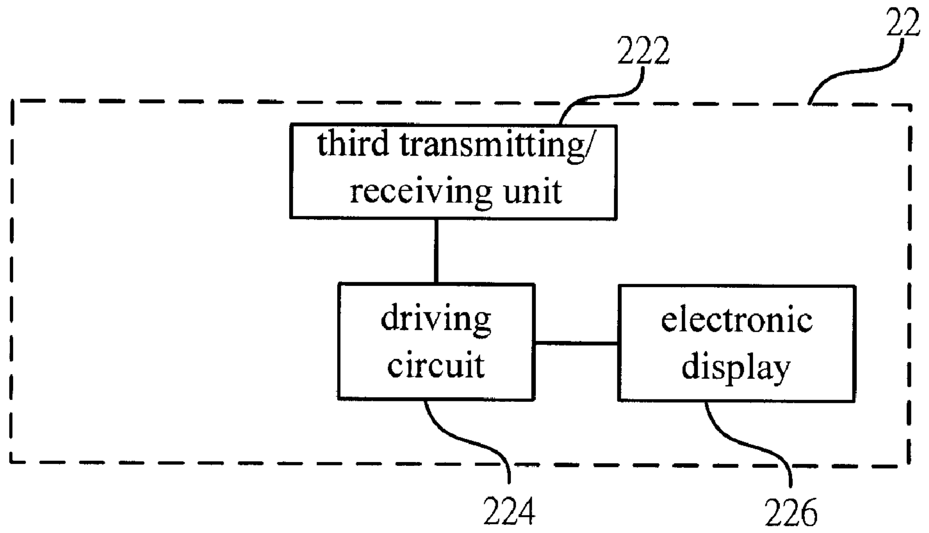
FIG. 4 is a schematic drawing showing a parking information display panel of an embodiment according to the present invention.

Referring to FIG. 3, the monitoring device 20 consists of a second transmitting/receiving unit 202 and a host 204 for showing checking results and transmitting command signals. As shown in FIG. 4, the parking information display panel 22 includes a third transmitting/receiving unit 222, a driving circuit 224, an electronic display 226. The driving circuit 224 drives the electronic display 226 to show the checking result.

Thus numbers of parking information sensing devices 10 forming the wireless mesh network 34, the monitoring device 20 and the parking information display panel 22 according to the present invention displays real time status of the parking space 32 so as to make users learn where there is a vacancy.

Figure 5:
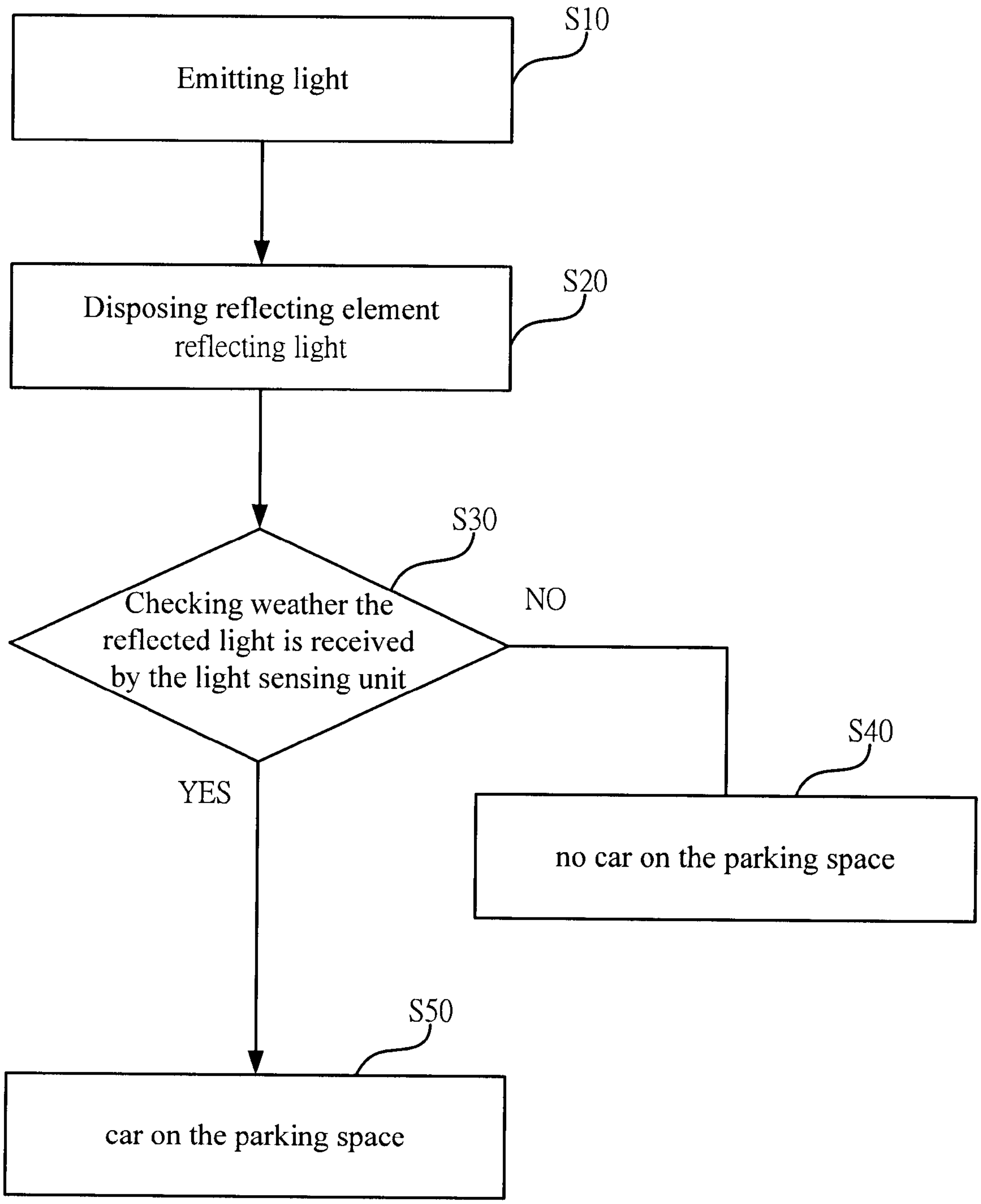
FIG. 5 is a flow chart of an embodiment according to the present invention.

Referring FIG. 5, a flow chart of an embodiment according to the present invention is disclosed. A method for providing parking information is to check whether light reflected by the reflecting element 14 is received for detecting whether there is a vehicle on a parking space 32. Referring to step S10, a light is emitted and the light path passes the parking space 32. Then as shown in the step S20, a reflecting element 14 is disposed on the parking space 32 and is located on the light path. Thus the light is reflected by the reflecting element 14 and the reflected light passes through a light sensing unit 16. Next run the step S30, check whether the reflected light is received by the light sensing unit 16 so as to judge whether the parking space 32 is occupied or not. When the reflected light is reflected by the reflecting element 14, referring to the step S40, it is judged that there is no car on the parking space 32 according to the sensing signal. When the reflected light is not reflected by the reflecting element 14 therefore the light sensing unit 16 receive nothing, as shown in step S50, it is judged if there is a car on the parking space 32 according to the sensing signal. Thus the present invention judges whether there is a vehicle on the parking space without complicated procedures.

Figure 6:
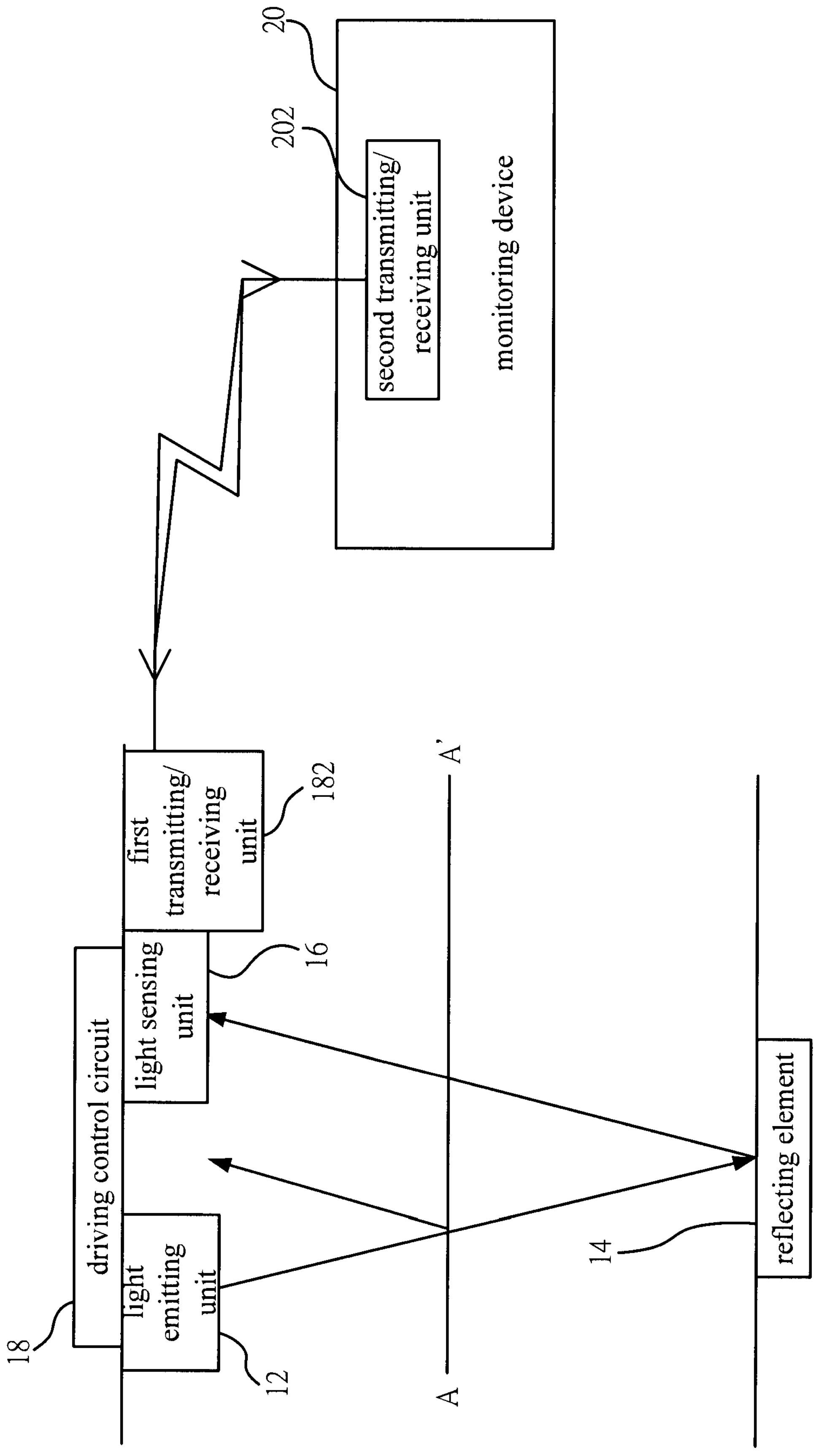
FIG. 6 is a schematic drawing showing a parking information sensing device and a parking space of an embodiment according to the present invention.

Referring to FIG. 6, a light emitting unit 12 for emitting light of the present invention is disposed on a position that faces the parking space 32 while a reflecting element 14 is disposed on the parking space 32 itself and is located on a path of the light emitted from the light emitting unit 12. The reflecting element 14 reflects the light from the light emitting unit 12. After being reflected, the light arrives a light-gathering member 162 of an light sensing unit 16 and the light sensing unit 16 generates a first sensing signal according to the light received by the light-gathering member 162. According to the first sensing signal, a driving control circuit 18 judges that there is no car on the parking space 32 and a first transmitting/receiving unit 182 sends the judging result of no car on the parking space 32 to a second transmitting/receiving unit 202 so that a monitoring device 20 displays the result of no car on the parking space 32. When there is a vehicle occupied the parking space 32, the reflected light is reflected by the line AA' which is the roof of the vehicle. The reflected light will not approach to light-gathering member 162 of an light sensing unit 16 and the light sensing unit 16 doesn't generate a first sensing signal or a second sensing signal so that the driving control circuit 18 judges that there is a car on the parking space 32. And the first transmitting/receiving unit 182 sends the checking result of a car on the parking space 32 to the second transmitting/receiving unit 202 so that the monitoring device 20 shows the result of a car occupied the parking space 32. Therefore, a parking information sensing device 10 according to the present invention provides users real-time information showing whether the parking space 32 is occupied or not.

When there is a car on the parking space 32, the car roof will reflect or scatter the light emitted from the light emitting unit 12. That means the light is reflected or scattered at the position of the line AA' and thus the light sensing unit 16 can't sense the light reflected by the car roof or only senses the light scattered by the car roof. Therefore, the light intensity received by the light sensing unit 16 is lower than the threshold so that the driving control circuit 18 judges that there is a car on the parking space 32 according to the sensing result of the light sensing unit 16.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A parking information sensing device for judging whether there is a car on a parking space comprising:
- a light emitting unit that emits a light passes the parking space;
- a reflecting element for reflecting the light arranged on the parking space and located on a path of the light;
- an light sensing unit located on a path of the light reflected by the reflecting element and receiving the reflected light reflected by the reflecting element so as to generate a first sensing signal; and
- a driving control circuit coupled to the light emitting unit as well as the light sensing unit and driving the light emitting unit to emit the light; the driving control circuit receiving the first sensing signal to judge there is no car on the parking space;
- wherein light emitted from the light emitting unit, reflected by the reflecting element and received by the light sensing unit within a circle area $\pi r^2$ whose radius is length of the wire harness of the light-gathering member is collected and the light-gathering member is a parabolic surface that concentrates and receives the light reflected by the reflecting element.

2. The parking information sensing device as claimed in claim 1, wherein the parking information sensing device further comprising:
- an indicating light unit coupled to the driving control circuit and showing a signal of available or occupied parking space according to judging results of the driving control circuit.

3. The parking information sensing device as claimed in claim 1, wherein the driving control circuit further coupled to a first transmitting/receiving unit while the first transmitting/receiving unit of each of a plurality of parking information sensing devices forms a wireless mesh network and the first transmitting/receiving unit correspond to a second transmitting/receiving unit as well as a third transmitting/receiving unit; the first transmitting/receiving unit sends judging results of the driving control circuit to the second transmitting/receiving unit or the third transmitting/receiving unit.

4. The parking information sensing device as claimed in claim 3, wherein second transmitting/receiving unit is coupled to a monitoring device that receives and displays a sensing result of the parking information sensing device by the first transmitting/receiving unit and the second transmitting/receiving unit while the monitoring device sends a command signal to the driving control circuit through the first transmitting/receiving unit and the second transmitting/receiving unit so that the driving control circuit sends status of the parking information sensing device to the monitoring device for display through the first transmitting/receiving unit and the second transmitting/receiving unit according to the command signal.

5. The parking information sensing device as claimed in claim 3, wherein the third transmitting/receiving unit is coupled to a parking information display panel that receives a judging result of the driving control circuit by the first transmitting/receiving unit and the third transmitting/receiving unit while the parking information display panel shows the judging result by means of a parking map.

6. The parking information sensing device as claimed in claim 3, wherein the first transmitting/receiving unit, the second transmitting/receiving unit and the third transmitting/ receiving unit all support Zigbee or IEEE802.15.4 communication protocol while the first transmitting/receiving unit, the second transmitting/receiving unit and the third transmitting/receiving unit form a wireless mesh network.

7. The parking information sensing device as claimed in claim 1, wherein the driving control circuit judges that the car is on the parking space when the light emitted from the light emitting unit is not arriving at the reflecting element due to the car on the parking space and the light sensing unit doesn't generate the first sensing signal correspondingly.

8. The parking information sensing device as claimed in claim 1, wherein the light sensing unit detects intensity of the light received according to a threshold value; when intensity of the light received by the light sensing unit is no less than the threshold value, the light sensing unit generates the first sensing signal.

9. The parking information sensing device as claimed in claim 8, wherein when the light emitted from the light emitting unit is not arriving at the reflecting element and is scattered to the light sensing unit due to the car on the parking space, the intensity of the light received by the light sensing unit is less than the threshold value so that the light sensing unit generates a second sensing signal; the driving control circuit receives the second sensing signal and judges that the car is on the parking space.

10. The parking information sensing device as claimed in claim 8, wherein when the light emitted from the light emitting unit is not arriving at the reflecting element due to the car on the parking space, the light is reflected by the car and the light sensing unit doesn't receive the light, the intensity of the light is less than the threshold value and the light sensing unit generates a second sensing signal or no signal; the driving control circuit judges the car is on the parking space according to the sensing result of the light sensing unit.

11. The parking information sensing device as claimed in claim 1, wherein the light sensing unit is disposed with a light-gathering member with wire harness so as to receive the light reflected by the reflecting element.

12. The parking information sensing device as claimed in claim 1, wherein the reflecting element having a mirror that reflects light emitted from the light emitting unit.

13. A method for providing parking information that is applied to judge whether a car is on a parking space comprising the steps of:

emitting a light and a path of the light passing the parking space;

arranging a reflecting element for reflecting the light on the parking space and the reflecting element located the path of the light;

receiving and sensing the light reflected by the reflecting element and generating a first sensing signal; and judging there is no car on the parking space according to the first sensing signal;

wherein light emitted from the light emitting unit, reflected by the reflecting element and received by the light sensing unit within a circle area $\pi r^2$ whose radius is length of the wire harness of the light-gathering member is collected and the light-gathering member is a parabolic surface that concentrates and receives the light reflected by the reflecting element.

14. The method for providing parking information as claimed in claim 13, wherein after the step of judging there is no car on the parking space according to the first sensing signal, the method further comprising a step of displaying status of no car on the parking space.

15. The method for providing parking information as claimed in claim 14, wherein before the step of displaying status of no car on the parking space, the method further comprising a step of transmitting the judging result by a wireless way.

16. The method for providing parking information as claimed in claim 13, wherein when the car is on the parking space and the light emitted to the reflecting element is blocked, the first sensing signal is not generated correspondingly and it is judged that the car is on the parking space.

17. The method for providing parking information as claimed in claim 13, wherein on the step of receiving and sensing the light reflected by the reflecting element and generating a first sensing signal, intensity of the light received is checked according to a threshold value; when intensity of the light received is no less than the threshold value, the first sensing signal is generated so as to judge there is no car on the parking space.

18. The method for providing parking information as claimed in claim 17, wherein when the car is on the parking space, the light emitted to the reflecting element is blocked and reflected by the roof of car and intensity of the light reflected is less than the threshold value, a second sensing signal is generated so as to judge there is a car on the parking space.

* * * * *